Patented Jan. 5, 1954

2,665,260

UNITED STATES PATENT OFFICE 2,665,260

PREPARATION OF INFUSIBLE RESINS OF SUPERIOR TOUGHNESS AND FLEXIBILITY FROM A KETODIGUANAMINE AND FORMALDEHYDE

John Kenson Simons, Toledo, Ohio, assignor, by mesne assignments, to Allied Chemical & Dye Corporation, New York, N. Y., a corporation of New York No Drawing. Original application June 8, 1946, Serial No. 675,439. Divided and this application November 5, 1951, Serial No. 254,975

6 Claims. (Cl. 260—17.3)

The invention relates to the preparation of novel infusible resins of superior toughness and flexibility.

The commonly used rapid-hardening thermosetting resins that are colorless and light-fast are those prepared by reacting formaldehyde with urea or melamine. The resins so prepared are the only colorless, light-fast thermosetting resins that are used commercially for making molded articles. An important deficiency of these resins is that they are relatively brittle. Their brittleness causes them to crack or craze when they are subjected to atmospheric conditions of varying humidity.

The principal object of the invention is the preparation of colorless, light-fast thermosetting resins which are not brittle but which are highly flexible and tough. More specific objects and advantages are apparent from the description, which merely discloses and illustrates the invention and is not intended to impose limitations upon the claims.

The present invention is based upon the discovery that greatly improved toughness and flexibility are provided by a novel type of molecular structure. This type of molecular structure is produced by the use of a particular type of molecule for reaction with formaldehyde, i. e., a molecule consisting of two diamino triazine rings connected by a pentamethylene radical in which the central carbon atom is disubstituted. It has been found that a substance having such a molecule reacts with formaldehyde to produce a thermosetting resin that is much more tough and flexible than a resin produced by reacting melamine with formaldehyde and is at least as water-resistant and heat-resistant.

A synthetic resin of superior toughness and flexibility is prepared in accordance with the invention by reacting formaldehyde with a substance selected from the class consisting of compounds having the general formula

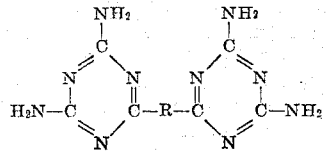

wherein —R— is a pentamethylene radical of the class consisting of (a) and (b), having the following structural formulas:

(a) 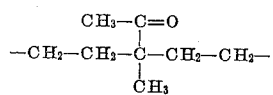

(b) 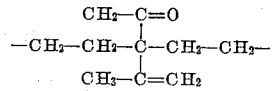

A derivative of a carboxylic acid in which the carboxy group is replaced by a 4,6-diamino-2-triazinyl radical is called a guanamine. Thus a substance having the above general formula may be considered to be a diguanamine that is a derivative of a dicarboxylic acid. Such a diguanamine is unique in that it may be produced readily and inexpensively by condensing with dicyandiamide the dinitrile corresponding to a dicarboxylic acid having the general formula HOOC—R—COOH wherein R is the divalent radical hereinbefore described. The condensation of the dinitrile with dicyandiamide is carried out by dissolving a strongly basic catalyst in a suitable primary or secondary alcoholic solvent such as benzyl alcohol or ethylene glycol mono-methyl ether, adding the dinitrile and from about 2.2 to about 2.6 moles of dicyandiamide for each mole of the dinitrile, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamine.

This method of preparation is versatile in that a large variety of dinitriles may be used for the reaction with dicyandiamide, to give a wide variety of diguanamines which, by reaction with formaldehyde, produce synthetic resins that have widely varied properties and therefore are suitable for various uses.

Dinitriles in which the cyano groups are separated by five carbon atoms in series, and in which the central carbon atom of the series is disubstituted, may be prepared by condensing acrylonitrile and a compound having an active methylene group, in the presence of a strong base.

In accordance with the invention, the substances hereinbefore described may be reacted either with formaldehyde or with a polymer thereof such as paraformaldehyde to produce an intermediate reaction product of the invention. When used for this reaction, paraformaldehyde is considered to split up so that the substance actually taking part in the reaction is formaldehyde. The substance may be ground in a ball mill with paraformaldehyde and powdered cellulose to form a mixture which then is worked on heated rolls or in a Banbury mixer to produce a molding compound.

The substances hereinbefore described may be reacted with a solution of formaldehyde in water, in an organic solvent such as an alcohol, or in a liquid containing both water and an organic solvent. If an organic solvent such as methyl, ethyl, propyl or butyl alcohol is employed, the solution of an intermediate reaction product that is obtained is suitable for use in coating compositions, and the reaction may be performed in an autoclave if desired, to secure a reaction temperature above the boiling point of the solvent. Thus, compositions of the invention include a thermosetting intermediate reaction product of an alcohol, formaldehyde and one of the diguanamines hereinbefore described.

The diguanamines hereinbefore described may be added to an ordinary commercial aqueous formaldehyde solution having a pH of 4, or to such a solution which has been made less acid or neutral or alkaline, preferably at a pH between 6 and 8, by addition of any desired base, such as sodium hydroxide, ammonium hydroxide, borax, or triethanolamine.

The proportion of formaldehyde actually reacting may range from an equimolecular proportion up to a maximum of two moles of formaldehyde for each amino group. An excess of either reactant beyond these proportions may be used if desired, although an uncombinable excess of one of the reactants usually is not desirable in the final product. Because of the complexity of the molecules of the reaction products that are produced, the proportion of formaldehyde actually reacting may vary freely between the limits stated.

The reaction proceeds at ordinary temperatures, but is expedited by heating. A thermosetting intermediate reaction product of the invention may be prepared by carrying the reaction only to its earliest stage, for example, the stage at which the reactants have just formed a common solution, or the reaction or condensation may be carried to any further stage (short of the final infusible resinous stage) at which the product still may be called an intermediate reaction product. By thus advancing the reaction, it is possible to obtain an intermediate reaction product that is insoluble but still fusible. An intermediate reaction product so prepared is capable of conversion by heat into an infusible resin.

For many purposes it is convenient to allow the soluble type of intermediate reaction product to remain in the form of a solution. Such a solution, after the addition of any desired ingredients, may be used as a binder in the production of impregnated or laminated products, as an adhesive, as a dressing or crease-proofing agent, as an ingredient for coating compositions, as a flame-proofing agent for wood, and as a composition to be converted into a foam that can be hardened to produce an insulating material.

A thermosetting intermediate reaction product of the invention may be obtained in dry form from a solution by evaporating or diluting it with water, to adjust its concentration to the proper value, and then spray-drying or vacuum drum-drying. It usually is more convenient to ship or store an intermediate reaction product in dry form than in the form of a solution. Various ingredients, such as fillers, pigments and hardening catalysts, may be mixed with a dry intermediate reaction product so that a coating composition, adhesive, binder or impregnating agent may be obtained simply by adding water or other solvent to the dry mixture.

A thermosetting intermediate reaction product embodying the invention preferably is neutralized before it is spray-dried or vacuum drum-dried, because a neutral product is most stable in storage. However, a product embodying the invention is stable over a wider range of pH than a urea-formaldehyde reaction product.

An acid catalyst may be used in hardening or converting the intermediate reaction product into an infusible resin. Since the action of such a catalyst is due solely to its acidity, any acid substance, such as an inorganic acid, an organic acid or an acid salt such as ammonium chloride or sulfate, may be used as the catalyst. The acidity may be furnished by mere addition of an acid substance to the intermediate reaction product, but acidity to catalyze the conversion of the intermediate reaction product to an infusible resin preferably is provided by incorporating a potential acid catalyst with the intermediate reaction product. A potential acid catalyst is a substance, which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate, Fillers, plasticizers, hot-plate lubricants, opacifiers, dyestuffs, pigments and other coloring matter may be incorporated with the intermediate reaction product to produce a suitable molding composition of the invention. In the preferred method of preparing a molding composition of the invention, a cellulose filler is impregnated with a solution of a soluble intermediate reaction product of the invention, and the solvent is then removed.

If fibrous cellulosic material in the form of paper pulp, wood flour or the like is employed as the filler, an aqueous solution of the intermediate reaction product used for impregnating the cellulosic material is preferably rendered acid (pH of about 4 to about 6). Heat may be used to facilitate the drying of the impregnated cellulose or other filler. Of course the drying temperature should not be sufficient to render the molding composition infusible. After the water or other solvent has been removed, the dry product may be ground in a ball mill to produce a homogeneous powder, and modifiers, such as plasticizers, lubricants and pigments may be incorporated in the grinding operation. If desired, the powder may be compressed into blanks or preforms of the proper size for use in various molds. The molding composition may be employed in the usual manner for the production of molded articles by compressing it in a closed mold at a pressure of 1 to 4 tons per square inch of projected area and a temperature of about 150° C. for a period of 1 to 5 minutes.

Articles of infusible resin embodying the invention may be produced by methods other than preparing and hot-pressing a molding composition, for example, by casting in open molds and baking. In any case, if no filler is used, transparent articles can be produced.

Since the synthetic resins of the present invention are colorless, the intermediate reaction products that have been described may be incorporated with a great variety of other resins or potential resins. Also, reaction products of formaldehyde with mixtures of the substances hereinbefore described with one another and with other substances such as urea or melamine may be produced. The intermediate reaction products in the resulting compositions then may be converted into the infusible resins, and a blend or copolymer of different resins thus may be obtained.

A urea-formaldehyde or melamine-formaldehyde resin, because of its brittleness, is not used alone in coating compositions, but is used in admixture with a large proportion of another resin, such as an alkyd resin, that imparts toughness and therefore resistance to cracking during changes in relative humidity. A synthetic resin embodying the invention, however, when used alone in a coating composition, because of its superior toughness and flexibility, produces a coating that is more resistant to weathering than a coating formed from an ordinary commercial coating composition containing both a urea resin and an alkyd resin. The resins of the present invention are particularly useful for the production of coating compositions because they react with alcohols more readily than urea- or melamine-formaldehyde resins, to produce alkylation products that are soluble in organic solvents. Coatings made by baking organic-soluble reaction products embodying the invention to convert them to the insoluble, infusible state are more resistant to organic solvents than baked melamine-formaldehyde resin coatings.

Intermediate reaction products embodying the invention cure faster and may be cured or hardened over a wider time and temperature range than intermediate reaction products of urea or melamine with formaldehyde. The more rapid cure of the present intermediate reaction products is an important advantage because it permits hardening to be carried out at a lower temperature or in a shorter period of time.

The superior toughness and flexibility of the infusible resins embodying the invention is most evident in their outstanding resistance to cracking and crazing when subjected to changes in atmospheric humidity. The resistance of the present resins to shattering under impact also is greater than that of urea- and melamine-formaldehyde resins. Moreover, pieces molded of the present infusible resins are unusually flexible, particularly while they are still hot, so that internally threaded bottle caps do not need to be unscrewed from the mold but can be stripped off without cracking.

*Example 1*

A solution of 288 grams of methyl ethyl ketone in 600 grams of tertiary butyl alcohol containing 20 grams of a 30 per cent methanol solution of potassium hydroxide is kept at a temperature between 0° and 5° C. and stirred for five hours during the drop-by-drop addition of 320 grams of acrylonitrile. An oily layer that separates soon solidifies. After two more hours of stirring at 5° C., the solid product is filtered off and air dried to produce an 88 per cent yield of gamma-methyl-gamma-acetyl pimelonitrile. After 33.5 grams of this product and 33.5 grams of dicyandiamide have been added to 75 grams of benzyl alcohol in which has been dissolved two grams of 85 per cent potassium hydroxide, the mixture is warmed. By the time the temperature reaches 130° C., heating is no longer necessary and exothermic reaction continues spontaneously for 15 to 20 minutes. The ingredients are then kept at 140° to 160° C. by heating for two hours longer. Then after the mixture has been cooled the solid is filtered off and washed with alcohol to produce a crude product, which may be purified by boiling it with water and filtering it off from the hot water. The purified product is a 65 per cent yield of a substance that is insoluble in water and soluble in a dilute acid and may be crystallized from benzyl alcohol, which is gamma-methyl-gamma-acetyl pimeloguanamine

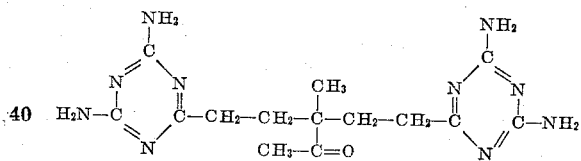

A 15 gram sample of this substance is heated with an equal weight of a commercial 37 per cent aqueous solution of formaldehyde containing 0.3 cc. of triethanolamine to give the solution a pH of about 7.3. The substance dissolves and then forms an intermediate reaction product that precipitates from the solution. The resulting suspension is mixed with 10 grams of alpha cellulose and then is dried at 185° F. for 35 minutes. After the dried composition has been ground in a ball mill, it is molded for three minutes at about 150° C. under a pressure of about three tons per square inch to produce a small disk having an appearance similar to that of a disk molded from a commercial cellulose-filled melamine-formaldehyde molding composition.

*Example 2*

A procedure is carried out that is the same as the procedure of Example 1, except that 54.5 grams of gamma-methyl-gamma-acetyl pimeloguanamine, 120 cc. of water, and 38 grams of a commercial 37 per cent aqueous solution of formaldehyde containing 0.15 cc. of a 50 per cent aqueous solution of triethanolamine are used. The latter solution has a pH of about 7. In this case, the resulting suspension is mixed with 35 grams of alpha cellulose and then is dried at 165° F. for 30 minutes. A disk molded from the composition is found to have a compressive strength and an impact strength about 50 to 75 per cent greater than that of similar disks molded from the best commercial cellulose-filled melamine-formaldehyde or urea-formaldehyde molding compositions. Internally threaded bottle caps molded under the same conditions as the disk for a period of two to four minutes can be stripped off the mold without cracking.

*Example 3*

A solution is prepared by heating the ingredients specified in Example 2. Before precipitation occurs, the solution is spread on layers of 1/16 inch birch veneer. After being dried for 30 minutes at room temperature and then pressed for five minutes at 300° F., the glued veneer is tested in the usual manner to determine the shear strength of the glue line. The shear strength is found to be between 500 and 600 pounds per square inch of glue line, with 50 to 90 per cent of the failure occurring in the wood rather than in the glue line.

*Example 4*

A commercial 37 per cent aqueous solution containing 0.071 mole of formaldehyde is mixed with 0.01 mole of gamma - methyl - gamma - acetyl pimeloguanamine. A sufficient amount of a 25 per cent aqueous solution of triethanolamine is then added to bring the pH to 6.8. After the ingredients have been refluxed for five minutes, a clear solution is formed. The solution is allowed to cool after a total of 30 minutes of refluxing, causing a reaction product to precipitate. Analysis of the resulting suspension by the sulfite method shows that the amount of the formaldehyde that has reacted is about 0.04 mole. The results are the same if the formaldehyde solution used is of the same volume but has been diluted to concentration of about 27 per cent so that it contains about 0.052 mole of formaldehyde. If the formaldehyde solution is of the same volume but contains only about 0.035 mole of formaldehyde, a clear solution is formed after eight minutes of refluxing and precipitation takes place after 25 minutes of refluxing. Analysis by the sulfite method shows that the amount of formaldehyde that has reacted is about 0.03 mole. If the formaldehyde solution is of the same volume but contains less than 0.02 mole of formaldehyde, a clear solution is not formed upon refluxing.

*Example 5*

A procedure is carried out that is the same as the procedure of Example 1, except that the initial ingredients are 98 grams of mesityl oxide, 100 grams of tertiary butyl alcohol, five grams of a 30 per cent aqueous solution of trimethylbenzylammonium hydroxide, and 106 grams of acrylonitrile; the intermediate product is 66 grams of gamma-isopropenyl-gamma-acetyl pimelonitrile; and the final ingredients are 51 grams of the intermediate product, 42 grams of dicyandiamide, five grams of 85 per cent potassium hydroxide and 100 grams of benzyl alcohol. The final product is 45 grams of a substance that melts at 273–4° C., which is gamma - isopropenyl - gamma - acetyl pimeloguanamine

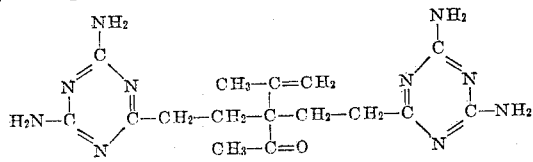

When this substance is reacted with formaldehyde, the results are substantially the same as in Example 5, except that the reaction product is slightly more soluble. A slightly shorter period of refluxing is required to form a clear solution in each case, and the solution tends to remain clear until it is allowed to cool after 30 minutes of refluxing. Even when the quantity of formaldehyde used is 0.018 mole, a clear solution is formed after 10 minutes of refluxing.

*Example 6*

After 100 grams of isobutyl alcohol, 43.25 grams of gamma-methyl-gamma-acetyl pimeloguanamine, 81 grams of a substantially methanol-free commercial, 37 per cent aqueous solution of formaldehyde and 0.5 gram of ethyl acid pyrophosphate have been refluxed for three hours at 92° C., a further addition of 200 grams of isobutyl alcohol is made and the solution then is filtered. The filtrate is evaporated under vacuum until water no longer separates from the distillate, and evaporation then is continued until the solution contains about 39 per cent of solids. The solution so prepared is straw in color, and can be diluted by 12 times its volume of a petroleum solvent or by an unlimited amount of xylene without precipitation. A film of the solution so prepared, on a glass plate, when baked for about ten minutes at 300° F. and cooled, is not softened appreciably by rubbing for two minutes with xylene or ethyl alcohol. In order to be unsoftened when subjected to the same test, a film of a solution prepared by the foregoing procedure must be baked about 30 minutes at 250° F.

*Example 7*

A sufficient quantity of hydrochloric acid is added to 18.2 grams of a commercial 37 per cent aqueous solution of formaldehyde to bring the pH to 2.2. After the addition of 12.9 grams of gamma-methyl-gamma-acetyl pimeloguanamine, the ingredients are heated on a boiling water bath until a sample of the solution after being cooled to 20° C. must be diluted with six times its volume of water at the same temperature in order to produce cloudiness. Analysis of the resulting solution by the sulfite method shows that the amount of formaldehyde that has reacted is about five moles. After being neutralized, the resulting solution undergoes no perceptible change while standing for two weeks at room temperature. After the addition of one per cent of its weight of ammonium chloride, the solution thus prepared is used for glueing two three-ply panels of plywood. The panels are permitted to dry for 15 minutes after the spreading of the adhesive solution, and then are pressed at 225 pounds per square inch for five minutes, one panel at 240° F., and the other panel at 300° F. The resulting panels are not delaminated after three and one-half hours of immersion in boiling water.

*Example 8*

One mole of gamma-methyl-gamma-acetyl pimeloguanamine is added to a commercial 37 per cent aqueous solution of formaldehyde containing six moles of formaldehyde, and triethanolamine is added to bring the pH to about 7.2. After about 15 minutes of refluxing, a clear solution is obtained that remains clear indefinitely. This solution is mixed with a quantity of alpha cellulose fluff approximately equal to the weight of gamma-methyl-gamma-acetyl pimeloguanamine used, the solution being kept hot during mixing to prevent precipitation. The impregnated cellulose is dried at 180° F. for about 30 minutes, and then is ground in a ball mill with about one per cent of its weight of benzoyl peroxide to produce a molding powder. Test pieces molded from this powder are found to increase in weight about the same amount as pieces molded from a commercial melamine-formaldehyde molding composition, when immersed in boiling water. However, the pieces so tested, upon drying out, do not exhibit nearly as much cracking as the melamine-formaldehyde pieces. The molded pieces so prepared also exhibit less cracking than melamine-formaldehyde pieces when subjected to extreme changes in atmospheric humidity for three times as long as the melamine-formaldehyde pieces. The light fastness, translucency, and freedom from discoloration on heating of the pieces so prepared are at least as good as that of commercial melamine-formaldehyde pieces, and the pieces so prepared do not suffer any crazing when held at an elevated temperature for a period four times as long as that which causes crazing of the best melamine-formaldehyde pieces at the same temperature. The structural strength of the pieces so prepared and their electrical properties are similar to those of commercial melamine-formaldehyde pieces except that the toughness and flexibility of the pieces so prepared are much greater.

This is a division of application Serial No. 675,439, filed June 8, 1946, and now abandoned.

Having described the invention, I claim:

1. A thermosetting intermediate reaction product of formaldehyde with a substance having the structural formula

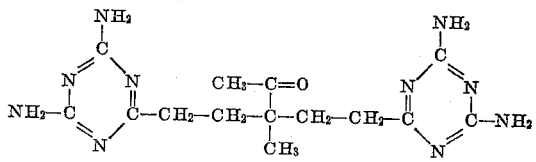

2. A thermosetting intermediate reaction product of formaldehyde with a substance having the structural formula

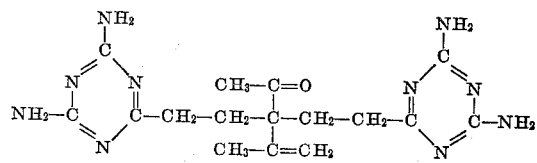

3. A method of producing a synthetic resin that comprises reacting formaldehyde with a substance having the general formula

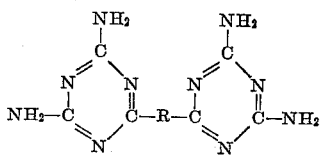

wherein —R— is a pentamethylene radical of the class consisting of (a) and (b), having the following structural formulas:

(a)
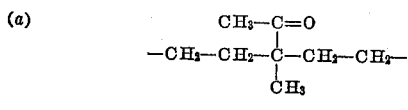

(b)
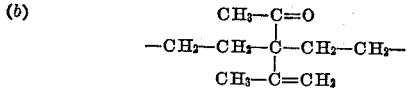

4. A thermosetting intermediate reaction product of formaldehyde with a substance having the general formula

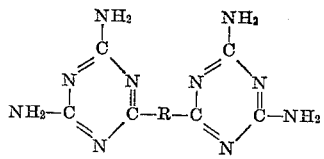

wherein —R— is a pentamethylene radical of the class consisting of (a) and (b), having the following structural formulas:

(a)
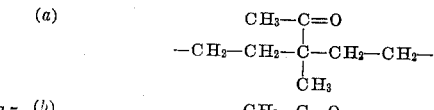

(b)
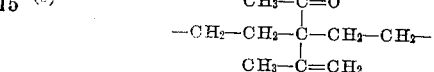

5. A thermosetting intermediate reaction product of an alcohol, formaldehyde and a substance having the general formula

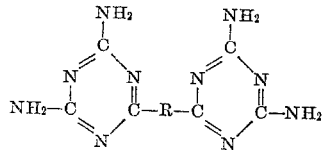

wherein —R— is a pentamethylene radical of the class consisting of (a) and (b), having the following structural formulas:

(a)
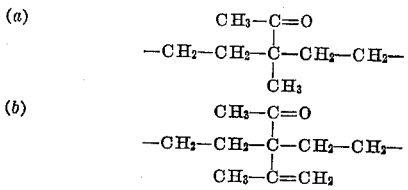

(b)

6. A molding composition comprising a cellulose filler and a thermosetting intermediate reaction product of formaldehyde with a substance having the general formula

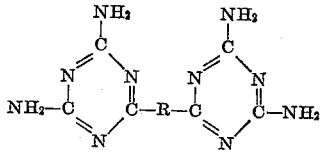

wherein —R— is a pentamethylene radical of the class consisting of (a) and (b), having the following structural formulas:

(a)
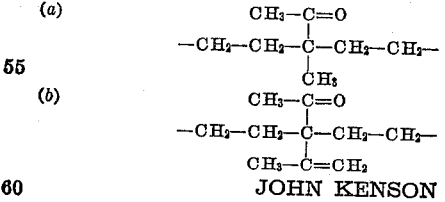

(b)

JOHN KENSON SIMONS.

References Cited in the file of this patent

UNITED STATES PATENTS

| Number | Name | Date |
|---|---|---|
| 2,197,357 | Widmer | Apr. 16, 1940 |
| 2,217,667 | Bruson | Oct. 15, 1940 |
| 2,328,963 | D'Alelio | Sept. 7, 1943 |
| 2,339,622 | D'Alelio | Jan. 18, 1944 |
| 2,394,526 | Thurston | Feb. 5, 1946 |
| 2,396,894 | Simons | Mar. 19, 1946 |
| 2,423,071 | Thurston | June 24, 1947 |
| 2,423,353 | Thurston | July 1, 1947 |
| 2,425,287 | Thurston | Aug. 5, 1947 |
| 2,427,315 | Thurston | Sept. 9, 1947 |
| 2,427,316 | Thurston | Sept. 9, 1947 |